US007017971B2

(12) United States Patent
Guillez et al.

(10) Patent No.: US 7,017,971 B2
(45) Date of Patent: Mar. 28, 2006

(54) ACTUATOR FOR A REAR PANEL ON A MOTOR VEHICLE

(75) Inventors: Jean-Marc Guillez, Cirieres (FR); Paul Queveau, Montravers (FR); Gérard Queveau, Le Pin (FR)

(73) Assignee: Societe Europeenne de Brevets Automobiles, Paris (FR)

( * ) Notice: Subject to any disclaimer, the term of this patent is extended or adjusted under 35 U.S.C. 154(b) by 28 days.

(21) Appl. No.: 10/501,965

(22) PCT Filed: Dec. 17, 2002

(86) PCT No.: PCT/FR02/04412

§ 371 (c)(1),
(2), (4) Date: Jul. 19, 2004

(87) PCT Pub. No.: WO03/062001

PCT Pub. Date: Jul. 31, 2003

(65) Prior Publication Data

US 2005/0067855 A1 Mar. 31, 2005

(30) Foreign Application Priority Data

Jan. 21, 2002 (FR) .................................. 02 00700
Jan. 30, 2002 (FR) .................................. 02 01098

(51) Int. Cl.
*B60J 7/20* (2006.01)

(52) U.S. Cl. .......................... 296/107.08; 296/136.05; 296/136.06

(58) Field of Classification Search ........... 296/107.08, 296/136.01, 136.04, 136.05, 136.06
See application file for complete search history.

(56) References Cited

U.S. PATENT DOCUMENTS

| | | | | |
|---|---|---|---|---|
| 2,845,299 | A * | 7/1958 | Pickering | 296/136.06 |
| 4,819,982 | A * | 4/1989 | Eyb | 296/107.17 |
| 5,090,764 | A * | 2/1992 | Kogawa et al. | 296/107.08 |
| 5,209,544 | A * | 5/1993 | Benedetto et al. | 296/107.18 |
| 6,030,023 | A * | 2/2000 | Guillez | 296/136.06 |
| 6,145,915 | A * | 11/2000 | Queveau et al. | 296/107.08 |
| 6,722,723 | B1 * | 4/2004 | Obendiek | 296/107.08 |
| 2003/0052508 | A1 * | 3/2003 | Obendiek | 296/107.08 |
| 2004/0017093 | A1 * | 1/2004 | Heller et al. | 296/136.06 |
| 2005/0067855 | A1 * | 3/2005 | Guillez et al. | 296/107.08 |
| 2005/0077751 | A1 * | 4/2005 | Guillez et al. | 296/107.08 |
| 2005/0116495 | A1 * | 6/2005 | Guillez et al. | 296/136.05 |

* cited by examiner

*Primary Examiner*—Patricia L. Engle
(74) *Attorney, Agent, or Firm*—Nawrocki, Rooney & Sivertson, P.A.

(57) ABSTRACT

The invention relates to an actuator for a rear panel (4), on a motor vehicle, for a lid (3) on a boot (2) and a convertible roof, which moves from a position covering the cabin of the vehicle to a position in which it is stored in the boot (2), said roof comprising at least one rear roof part (5). The above comprises a panel support connected to the vehicle chassis (1) by pivots, such that said panel (4) moves from an open position to one of two closed positions, means displacing said panel (4) relative to the support body, elastic retainers for said panel (4) in the direction of the lid (3) and stops (13, 14) between-said panel (4) and said rear piece (5) of the roof when the above is in the closed position.

4 Claims, 7 Drawing Sheets

ACTUATOR FOR A REAR PANEL ON A MOTOR VEHICLE

The present invention concerns a device for controlling a rear panel of a motor vehicle, and more particularly of a motor vehicle provided with a rear boot, a lid for the boot, and a roof which can be folded from a position where it covers the vehicle cabin to a position where it is stored in the rear boot, the said roof comprising at least one rear roof part.

Such vehicles are known provided with a roof which can be folded into their rear boot.

This roof can in particular consist of a plurality of rigid roof parts able either to close off the vehicle cabin like a coupé or saloon or to be stored in the rear boot in order to form a cabriolet from it.

These vehicles are also provided with a rear panel joining the top part of the rear seat back rests to the front end of the boot lid.

Various proposals have already been made for retracting this panel when the roof passes from one position to another so as to leave clear a passage for the roof elements.

The problem which is posed is that of the interposing of the rear edge of the rear part of the roof between the rear arm of the panel and the front edge of the boot lid when the roof is in its closure position where it covers the vehicle cabin.

This is because, in this position, the thickness of the rear edge of the rear part of the roof occupies a certain longitudinal space so that it is necessary to retract part of the longitudinal bulk of the rear panel when the roof is in the closed position.

The present invention aims to mitigate these drawbacks.

To this end, the first object of the invention is a device for controlling a rear panel of a motor vehicle provided with a rear boot, a lid for the said boot, and a roof which can be folded from a position in which it covers the vehicle cabin to a position in which it is stored in the rear boot, the said roof comprising at least one rear roof part, characterised by the fact that it comprises on at least one of the sides of the vehicle:

- a panel support member connected to the vehicle chassis by pivoting means so that the said panel passes, by means of a pivoting of the said support member, from an open position in which the said panel is substantially vertical and in which it leaves clear a passage for the said roof, to one of two closed positions where the said panel extends substantially horizontally in a position of closure of the said passage between the chassis and the front edge of the lid of the said rear boot in the first closed position, and between the chassis and the rear edge of the rear part of the roof in the second closed position;
- means of moving the said rear panel in translation with respect to the said support member;
- means of elastic return of the said panel with respect to the said support member in the direction of the said lid; and
- means of abutment between the said panel and the said rear part of the roof when the latter is in the closed position.

It will be understood that, because of this translation movement with respect to the support member, the total longitudinal bulk of the panel is reduced, thus providing sufficient space for housing the rear edge of the rear part of the roof.

In a first embodiment, the pivoting means are formed by a transverse rotation shaft fixed with respect to the chassis.

In a second embodiment, the pivoting means are formed by two articulated arms connected to the chassis.

A second object of the invention is a vehicle comprising such a device.

A description will now be given by way of non-limiting example of two particular embodiments of the invention with reference to the accompanying schematic drawings, in which.

Figure 1:
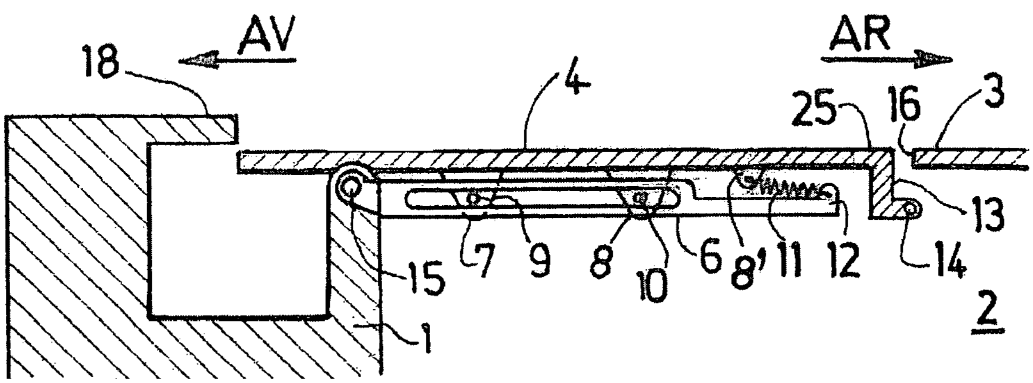
FIG. 1 is a view in longitudinal section of the rear part of a vehicle according to the invention, with the roof folded in the rear boot and the panel in a first closure position, according to a first embodiment of the pivoting means.

In the figures, the directions towards the front and towards the rear of the vehicle are designated respectively by the arrows AV and AR.

The vehicle depicted in the drawings comprises a chassis 1, a rear boot 2 closed by a lid 3, a rear panel 4, and a folding roof comprising a rear part 5.

The roof can be folded between two extreme positions: a closure position in which it covers the vehicle cabin, and a position in which it is stored in the rear boot 2 of the said vehicle.

This vehicle comprises in general terms:

- a member supporting the said panel 4 connected to the chassis 1 of the vehicle by pivoting means;
- means of moving the said rear panel 4 in translation with respect to the said support member;
- means of elastic return of the said panel 4 with respect to the said support member in the direction of the said lid 3, and
- stop means between the said panel 4 and the said rear part 5 of the roof when the latter is in the closed position.

In the embodiments depicted in FIGS. 1 to 7, the support member is formed by a runner 6. The panel 4 is able to move in translation with respect to the said runner 6 by means of lugs 7 and 8 formed on the said panel 4, each provided with a roller 9, 10.

A spring 11 connected by one of its ends to the rear lug 8' of the panel 4, and by its other end to an extension 12 of the runner 6, has the function of exerting a return force on the panel 4 with respect to the runner 6 in the direction of the lid 3.

In addition, stop means comprising the rear extension 13 of the panel 4, and a buffer 14, are provided so as to allow the locking of the panel 4 against the rear part 5 of the roof when the latter is in the closed position. The front edge of this rear part 5 comprises a hollow in which the buffer 14 can engage in order to afford the centring, guiding and locking of the panel 4.

A description is now given, in relation to the figures, of the various positions of the panel 4, intended to allow passage of the roof from its storage position in the rear boot 2 to its closure position in which it covers the cabin, and this according to two embodiments of the pivoting means of the said panel 4.

Figure 2:
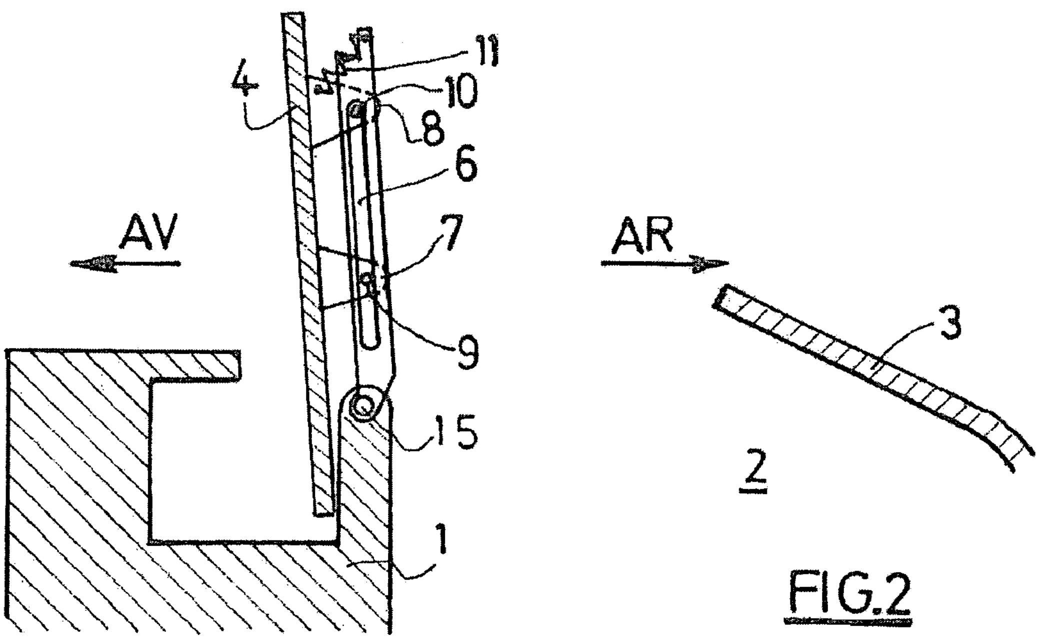
FIG. 2 is a view similar to FIG. 1, with the panel in the open position.
Figure 3:
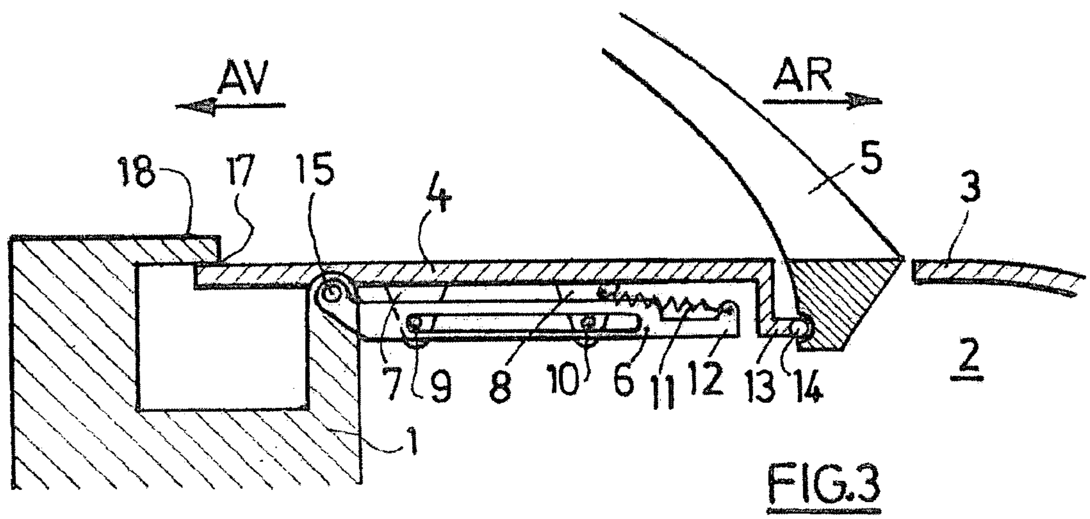
FIG. 3 is a view similar to FIGS. 1 and 2 with the roof in the position of closure of the vehicle cabin and the rear panel in a second closure position.
Figure 4:
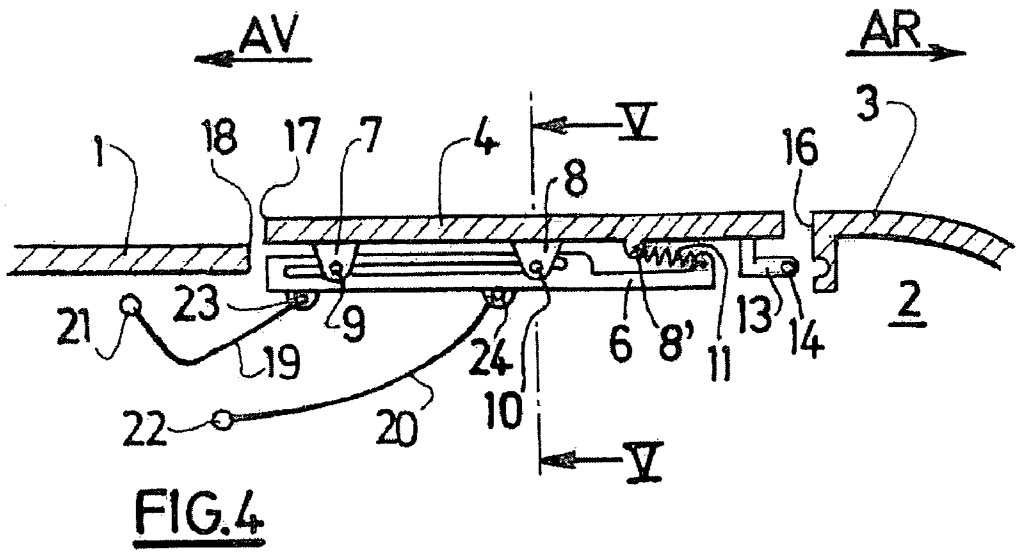
FIG. 4 is a view in longitudinal section of the rear part of a vehicle according to the invention, with the roof folded in the rear boot and the panel in a first closure position, according to a second embodiment of the pivoting means.
Figure 5:
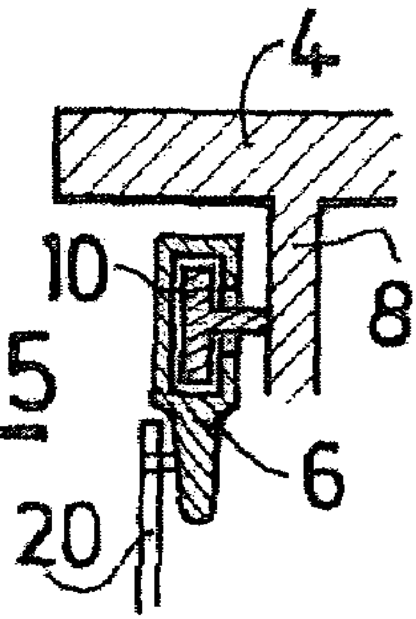
FIG. 5 is a view along the section V—V in FIG. 4.
Figure 6:
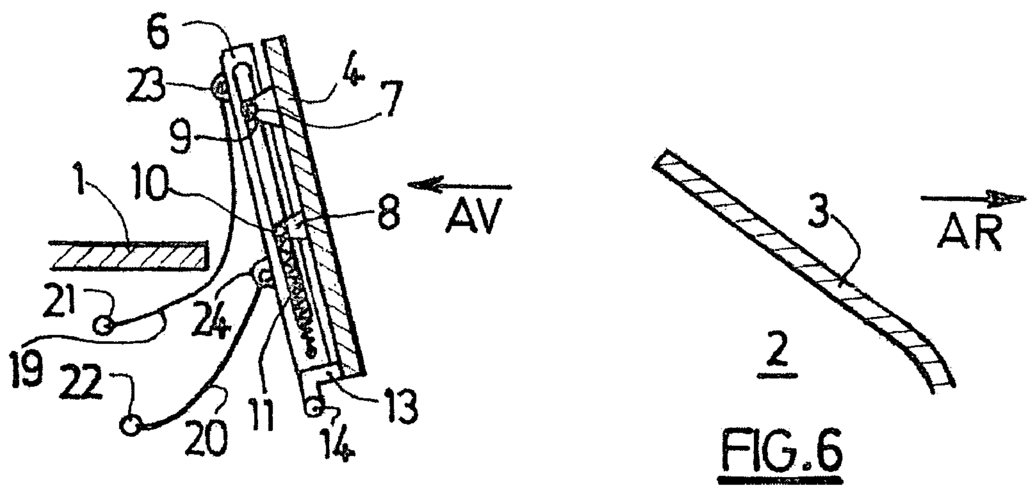
FIG. 6 is a view similar to FIG. 4, with the panel in the open position.
Figure 7:
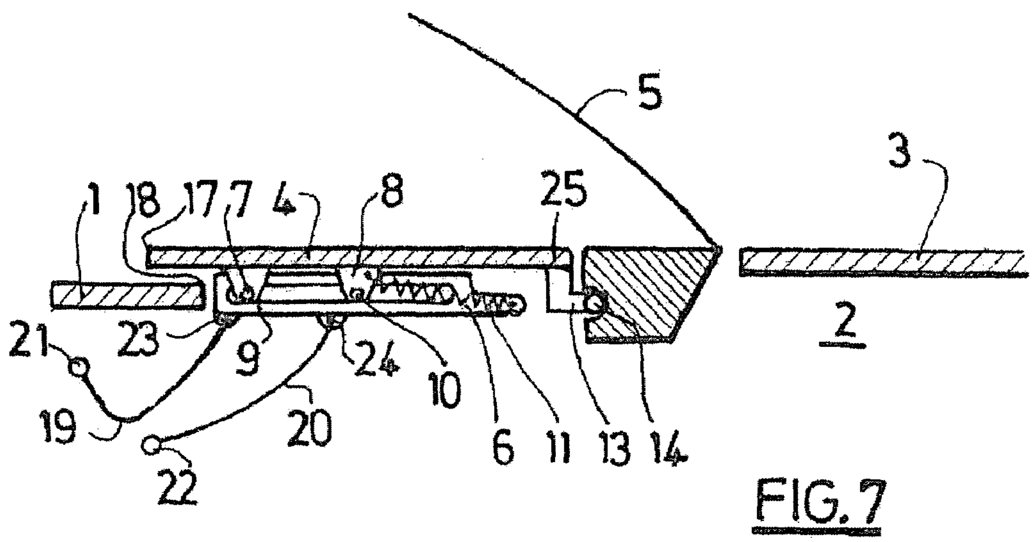
FIG. 7 is a view similar to FIGS. 4 and 6, with the roof in the position of closure of the vehicle cabin and the rear panel in a second closure position.

According to a first embodiment, illustrated by FIGS. 1 to 3, the pivoting means of the panel 4 are formed by a transverse rotation shaft 15 fixed with respect to the chassis 1.

When the roof is stored inside the boot 2 (FIG. 1), the panel 4 is in a first closed position. In this position, the panel 4 extends substantially horizontally between the chassis 1 and the front edge 16 of the lid 3 of the rear boot 2, the front part 17 of the said panel 4 being situated below the rear part 18 of the chassis 1.

In addition, in this position, the return spring 11 is arranged so as to hold the panel 4 in its most retracted position, that is to say its position closest to the front edge 16 of the lid 3 of the boot 2. The roller 10 is consequently in abutment against the rear part of the runner 6.

When the roof emerges from the boot 2 (FIG. 2), the lid 3 of the boot 2 opens and the panel 4 passes into its open position in which it is substantially vertical. This passage takes place by pivoting of the runner 6 about the rotation shaft 15, which causes the tilting of the panel 4 towards the front of the vehicle.

Consequently, in this open position, the panel 4 releases a passage for the roof.

When the roof arrives at a minimum in an intermediate position (not shown), that is to say when the rear part 5 of the roof is not completely in the closed position, the panel 4 in an open position tilts towards the rear of the vehicle, by pivoting of the runner 6 about the rotation shaft 15.

Then, when the rear part 5 of the roof is in the closed position (FIG. 3), that is to say when the roof covers the vehicle cabin, the panel 4 passes into its second closed position, in which it extends substantially horizontally between the chassis 1 and the rear edge of the rear part 5 of the roof.

To this end, the panel 4 comes into abutment on the rear part 5 of the roof, by means of the stop means 13, 14. These stop means afford the centring, guiding and locking of the panel 4.

The panel 4 then slides in the runner 6 forwards, the front part 17 of the said panel 4 coming to be housed under the rear part 18 of the chassis 1.

In this position, the return spring 11 is completely extended.

According to the second embodiment, illustrated by FIGS. 4 to 7, the pivoting means are formed by two articulated arms 19, 20 connected firstly to the chassis 1 by two rotation shafts 21, 22 transverse to the vehicle, and on the other hand to the runner 6 by two transverse rotation shafts 23, 24 integral with this runner.

When the roof is stored inside the boot 2 (FIG. 4), the panel 4 is in its first closed position, in which it extends substantially horizontally between the chassis 1 and the front edge of the lid 3 of the rear boot 2, the front part 17 of the said panel 4 being situated above the rear part 18 of the chassis 1.

In this position, the return spring 11 is arranged so as to hold the panel 4 in its most retracted position, that is to say its position closest to the front edge 16 of the lid 3 of the boot 2. Owing to the presence of the stop means 13 and 14, the roller 10 is not in abutment against the rear part of the runner 6.

When the roof emerges from the boot 2 (FIG. 5), the lid 3 of the boot 2 opens and the panel 4 passes into its open position in which it is substantially vertical. This passage takes place by pivoting of the two arms 19, 20, which causes the movement of the runner 6 and consequently that of the panel 4. The front part 17 of the panel 4 then tilts upwards, whilst its rear part 25 tilts downwards.

In this open position, the panel 4 therefore leaves clear a passage for the roof.

When the roof arrives at a minimum in an intermediate position (not shown), that is to say when the rear part 5 of the roof is not completely in the closed position, the panel 4 in the open position tilts towards the rear of the vehicle by pivoting of the two arms 19, 20. This pivoting in fact causes the downward tilting of the front part 17 of the panel 4, and the upward tilting of its rear part 25.

Then, when the rear part 5 of the roof is in the closed position (FIG. 6), that is to say when the roof covers the vehicle cabin, the panel 4 passes into its second closed position, in which it extends substantially horizontally between the chassis 1 and the rear edge of the rear part 5 of the roof. To this end, the panel 4 comes into abutment on the rear part 5 of the roof, by means of the stop means 13, 14. The panel 4, held by the return spring 11, then slides in the runner 6 forwards, the front part 17 of the said panel 4 coming to be housed on the rear part 18 of the chassis 1.

What is claimed is:

1. A device for controlling a rear panel (4) of a motor vehicle provided with a rear boot (2), a lid (3) for said boot (2), and a roof which can be folded from a position in which it covers the vehicle cabin to a position in which it is stored in the rear boot (2), said roof comprising at least one rear roof part (5), characterised by the fact that it comprises on at least one of the sides of the vehicle:

a panel support member connected to the vehicle chassis by pivoting means so that said panel passes, by means of a pivoting of said support member, from an open position in which said panel is substantially vertical and in which it leaves clear a passage for said roof, to one of two closed positions where said panel extends substantially horizontally in a position of closure of said passage between the chassis and the front edge (16) of the lid (3) of said rear boot in the first closed position, and between the chassis and a rear edge of the rear part (5) of the roof in the second closed position;

means of moving said rear panel (4) in translation with respect to said support member;

means of elastic return of said panel (4) with respect to said support member in the direction of said lid (3); and means of abutment (13, 14) between said panel (4) and said rear part (5) of the roof when the latter is in the closed position.

2. A device according to claim 1, characterised by the fact that the pivoting means are formed by a transverse rotation shaft (15) fixed with respect to the chassis (1).

3. A device according to claim 1, characterised by the fact that the pivoting means are formed from two articulated arms (19, 20) connected to the chassis (1).

4. A motor vehicle, characterised by the fact that it comprises a device according to claim 1.

* * * * *